United States Patent [19]

Haneda

[11] Patent Number: 5,265,196
[45] Date of Patent: Nov. 23, 1993

[54] IMAGE FORMING APPARATUS

[75] Inventor: Satoshi Haneda, Hachioji, Japan

[73] Assignee: Konica Corporation, Tokyo, Japan

[21] Appl. No.: 932,978

[22] Filed: Aug. 20, 1992

[30] Foreign Application Priority Data

Aug. 30, 1991 [JP] Japan .................. 3-220333
Jan. 6, 1992 [JP] Japan .................. 4-000382

[51] Int. Cl.⁵ .......................................... G06K 15/00
[52] U.S. Cl. ...................................... 395/109; 395/107
[58] Field of Search ............... 395/109, 110, 141, 132, 395/150, 107; 340/731; 346/154, 160, 107 R, 108; 358/296, 298, 300, 302

[56] References Cited

U.S. PATENT DOCUMENTS 4,467,367  8/1984  Ohara et al. ................ 358/298
4,907,282  3/1990  Daly et al. ................... 340/731
5,113,491  5/1992  Yamazaki .................... 395/141

Primary Examiner—Arthur G. Evans
Attorney, Agent, or Firm—Finnegan, Henderson, Farabow, Garrett & Dunner

[57] ABSTRACT

In an apparatus for forming an electrostatic latent image in a form of a dot for each of pixels on a photoreceptor, there is provided a memory to store outline font data in a form of a multicoded value. A light beam is modulated on the basis of the outline font data so that a dot-shaped latent image corresponding to the outline font has an intermediate density data.

15 Claims, 17 Drawing Sheets

⁄⁄ : region relating to S1
≡ : region relating to S2
||| : region relating to S3
\\ : region relating to S4

/// : region relating to S1
≡ : region relating to S2
||| : region relating to S3
\\\ : region relating to S4 one pixel one pixel

FIG. 19

| one pixel | | | | | | |
|---|---|---|---|---|---|---|
| 0 | 0 | 0 | 0 | 0 | 0 | 0 |
| 0 | 0 | 0 | 1 | 0 | 0 | 0 |
| 0 | 0 | 1 | 0 | 1 | 0 | 0 |
| 0 | 0 | 1 | 1 | 1 | 0 | 0 |
| 0 | 1 | 0 | 0 | 0 | 1 | 0 |

IMAGE FORMING APPARATUS

BACKGROUND OF THE INVENTION

The present invention relates to an image forming apparatus in which image data is processed specially and a plurality of laser beams scans one pixel so that the image of high density and sharpness can be reproduced.

In the field of image forming apparatus using an electrophotographic method, a digital halftone image is reproduced in the following manner: an image signal of an original image is read by a scanner; and image density data in which the image signal is gradation-corrected, A/D converted, and shading-corrected, is modulated by a reference signal.

When an original image is read by the scanner, an edge portion of the image is read in a halftone density due to the aperture of a solid state image pick-up element installed in the scanner. When a latent image is formed on a photoreceptor with image density data obtained from this image signal, recording pixels corresponding to the edge portion of the latent image are recorded on average in the case where the density is intermediate. Therefore, sharpness of the recorded image is lowered. The aforementioned deterioration of sharpness can not be prevented even when MTF correction is conducted on the image signal.

On the other hand, even when an interpolated character or figure is formed from computer graphic (C.G.) data or font data, the same problem is caused. That is, when the edge portion is interpolated smoothly by the intermediate density of the interpolation data, a recording pixel corresponding to the edge portion is recorded in pixels as average density, and thereby the resolution is lowered in the same manner.

As shown in FIG. 19, most of conventional data is developed to a binary bit-map. Therefore, the edge portions of characters do not become smooth. Especially when variable magnification RE or MTF correction is conducted, zig-zags edges appear or some portions of a character are cut out. For that reason, it is necessary to conduct intermediate density processing on the edge portion of an image.

SUMMARY OF THE INVENTION

In view of the foregoing problems, an object of the present invention is to provide an image forming apparatus in which sharpness and resolution of an image formed from scanner data, C.G data, font data and the like, can be improved.

The aforementioned object can be accomplished by an image forming apparatus having a memory means storing image data, characterized in that an outline font is made into a multi-value and developed to the aforementioned memory means so that the outline font can be used as intermediate density information.

In a preferable embodiment of the present invention, image processing circuits such as variable magnification/RE/image discrimination/and MTF circuits are provided between the aforementioned memory means and a selection circuit disposed at the next stage of the memory means.

The aforementioned object can be accomplished by an image forming apparatus having a memory means storing image data, characterized in that: an outline font is made into a multi-value and developed to the aforementioned memory means in the form of a bit map so that the outline font can be used as intermediate density information; the writing position of an output pixel is calculated from this bit map; and a dot image is formed which has been recording-position-modulated in the primary scanning direction according to the result of the aforementioned calculation.

In a preferable embodiment of the present invention, the aforementioned recording-position-modulation in the primary scanning direction is conducted when a reference wave is selected.

BRIEF DESCRIPTION OF THE DRAWINGS

FIG. 19 is a view showing the structure of a character formed by conventional binarized data.

DETAILED DESCRIPTION OF THE PREFERRED EMBODIMENT

Figure 4:
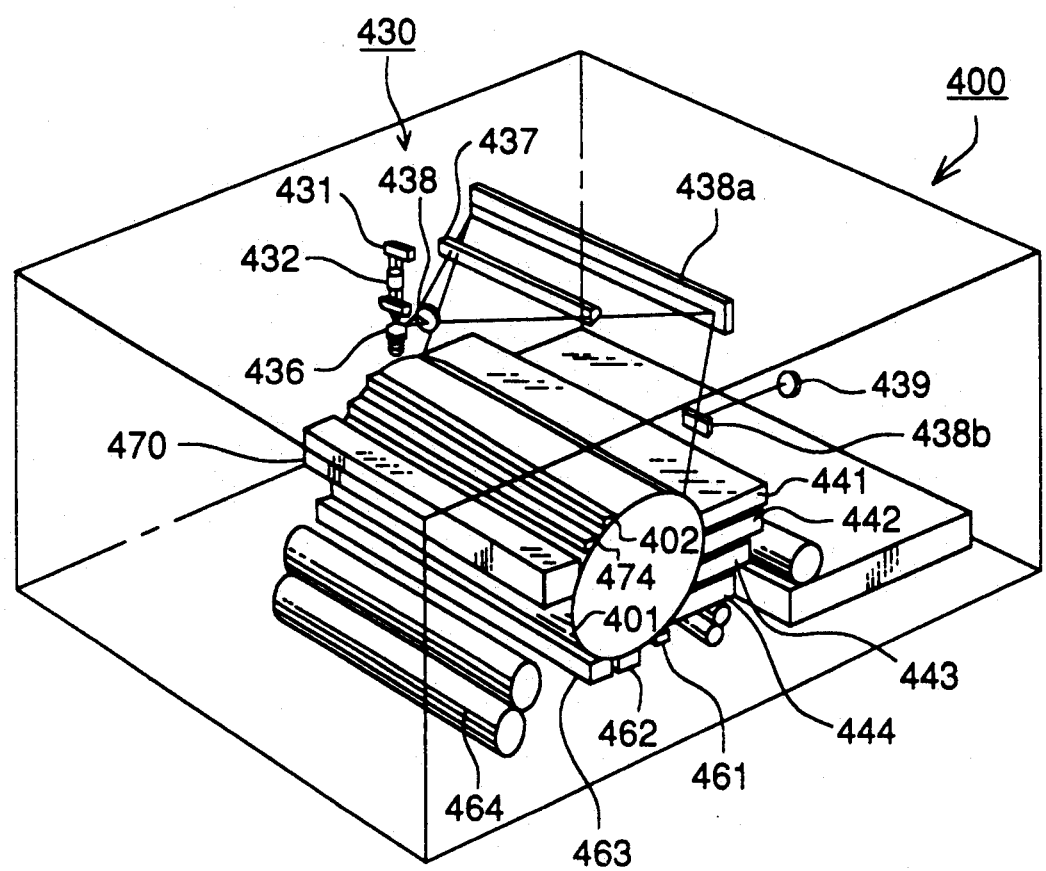
FIG. 4 is a perspective view showing the outline of structure of the image forming apparatus of the present invention.
Figure 5A:
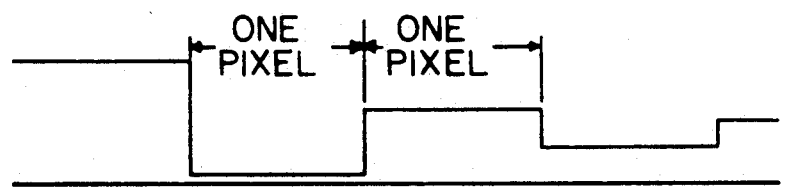
FIGS. 5a-5d are time charts showing a signal of each part in the modulation signal generating circuit in the example shown in FIG. 1.
Figure 5B:
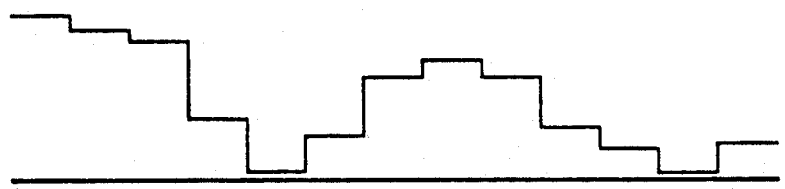
Figure 5C:
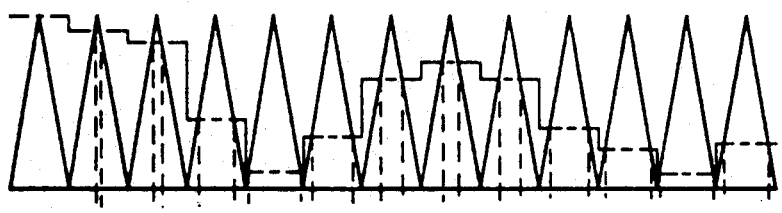
Figure 5D:
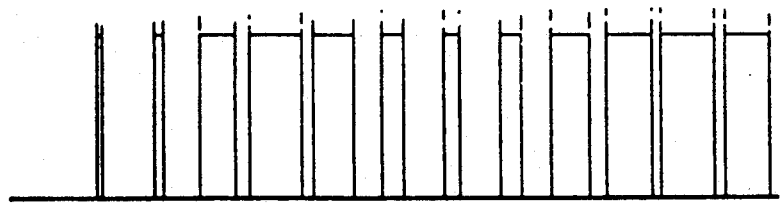

The structure of an image forming apparatus 400 which is an example of the present invention, will be described as follows. FIG. 4 is a perspective view showing the outline of the structure of the image forming apparatus of the present embodiment.

An image forming apparatus 400 acts the following functions in which: the photoreceptor is uniformly charged; after that, a dot-like electrostatic latent image is formed by a spot light which is pulse-width-modulated according to a modulation signal obtained by differentially amplifying an analog image density signal which is obtained by D/A converting digital image density data obtained from a computer or a scanner, and a reference wave signal; a dot-like toner image is formed by reversal development of the latent image; charging, exposing, and developing are repeatedly conducted so that a color toner image can be formed on the photoreceptor; the color toner image is transferred onto a recording sheet; the recording sheet are separated from the photoreceptor; and then the image is fixed so that the color image can be obtained.

The image forming apparatus 400 is composed of: a photoreceptor which is a drum-like image forming body 401 rotated in the arrowed direction (hereinafter, it will be called simply a photoreceptor); a scorotron charger 402 by which the surface of the photoreceptor 401 is uniformly charged; an optical scanning system 430; developing units 441 to 444 in which yellow, magenta, cyan, and black toner are loaded; a pre-transfer charger 461; a scorotron transfer unit 462; a fixing roller 464; a separator 463; a cleaning unit 470; a discharger 474; and the like.

In the optical system 430, a laser beam emitted from the semiconductor laser 431 having 3 light emitting sections is made nearly parallel by the collimator lens 432. The image is exposed by this laser beam in the following manner: the laser beam is reflected by a rotational polygonal mirror 434 which is rotated at a constant speed; a minute laser spot is formed on the peripheral surface of the uniformly charged photoreceptor 401 by an $f\theta$ lens 435 and an cylindrical lens 436; and then the laser beam becomes a laser spot so that scanning can be conducted and then the image can be exposed. In the aforementioned optical system, the $f\theta$ lens 435 is a correction lens by which a constant speed optical scanning operation is conducted, and the cylindrical lenses 433 and 436 are lenses by which deviation of the position of the spot is corrected when the rotational polygonal mirror 434 is tilted. Numeral 437 is a scanning mirror which reflects laser beams. Numeral 438 is an index mirror. Numeral 439 is an index sensor. Start of scanning conducted by laser beams is detected by an index signal sent from the index sensor 439, and at the same time, the surface position of the rotational polygonal mirror 434 rotating at a predetermined speed is also detected so that the period of the primary scanning direction is detected. Due to the foregoing, the aforementioned laser beam spot scans the surface of the photoreceptor drum 401 in the direction parallel with the drum shaft.

Figure 15:
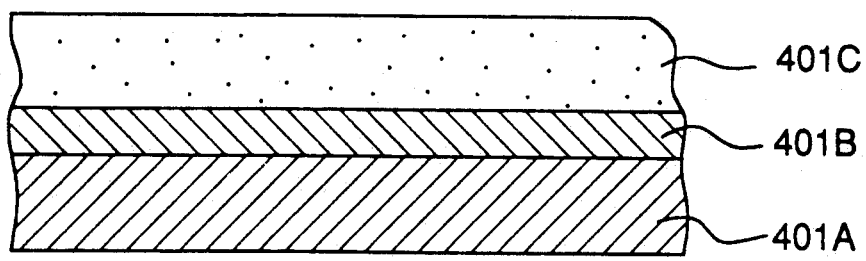
FIG. 15 is a sectional view showing an example of specific structure of a high γ photoreceptor utilized in the example.

The photoreceptor 401 used in the present embodiment has a high $\gamma$ characteristic and FIG. 15 shows an example of its specific structure.

The photoreceptor 401 is formed by a conductive support 401A, an intermediate layer 401B, and a photosensitive layer 401C, as shown in FIG. 15. Thickness of the photosensitive layer 401C is about 5 to 100 μm, and preferably 10 to 50 μm. The photoreceptor 401 is structured in the following manner: a drum-like conductive support 401A, which is made of aluminum and has a diameter of 150 mm, is used for the photoreceptor; the intermediate layer 401B, which is made of ethylene-acetic acid vinyl copolymer and whose thickness is 0.1 μm, is formed on the conductive support 401A; and the photosensitive layer 401C, whose thickness is 35 μm, is provided on the intermediate layer 401B.

As the conductive support 401A, a drum, which is made of aluminum, steel, copper, and the like, and has a diameter of about 150 mm, is used, however, a belt-like body in which a metal layer is laminated or vapor-deposited on a paper or a plastic film, or a metallic belt such as a nickel belt, which is made by the method of electroforming, may be used as the conductive support. The intermediate layer 401B is preferably provided with the following properties: it can resist high charging voltage of ±500 V to ±2000 V; for example, in the case of positive charging, injection of electrons from the conductive support IC can be prevented; and Hall mobility can be provided so that superior light decay characteristics due to an avalanche phenomenon can be obtained. For the aforementioned reasons, positive charging type electric charge conveyance material, for example, disclosed in Japanese Patent Application No. 188975/1986 which has been proposed by the inventors of the present invention, is preferably added by not more than 10 weight % to the intermediate layer 401B.

As the intermediate layer 401B, the following resins, for example, which are used for a photosensitive layer of electrophotography, can be used normally.

(1) Vinyl polymer such as polyvinyl alcohol (Poval), polyvinyl methyl ether, and polyvinyl ethyl ether, (2) Nitrogen vinyl polymer such as polyvinylamine, poly-N-vinyl imidazole, polyvinyl pyridine (quarternary salt), polyvinyl pyrrolidone, and vinyl pyrrolidone-vinyl acetate copolymer, (3) Polyether polymer such as polyethylene oxide, polyethylene glycol, and polypropylene glycol, (4) Acrylic acid polymer such as polyacrylic acid and its salt, polyacrylamide, poly-$\beta$-hydroxy ethylacrylate, (5) Methacrylate polymer such as polymethacrylate and its salt, polymethacrylamide, and polyhydroxy propyl methacrylate, (6) Ether cellulose polymer such as methyl cellulose, ethyl cellulose, carboxy methyl cellulose, hydroxy ethyl cellulose, and hydroxy propyl methyl cellulose, (7) Polyethylene imine polymer such as polyethylene imine, (8) Polyamino acid such as polyalanine, polyserine, poly-L-glutamine acid, poly-(hydroxy ethyl)-L-glutamine, poly-$\delta$-carboxy methyl-L-cysteine, polyproline, lysine-tyrosine copolymer, glutamic acid-lysine-alanine copolymer, silk fibroin, and casein, (9) Starch and its derivative such as starch acetate, hydroxyl ethyl starch, starch acetate, hydroxy ehtyl starch, amine starch, and phosphate starch,

(10) Polymer which is soluble in mixed solvent of water and alcohol, such as soluble nylon, and methoxy methyl nylon (8 type nylon) which are polyamide.

The electric charge conveyance material is not used for the photosensitive layer 401C basically, and the photosensitive layer 401C is formed by the following manner: phthalocyanine minute particles, which are made of photoconductive pigment and whose diameter is 0.1 to 1 μm, antioxidant and binder resin are mixed and dispersed by using a solvent for the binder resin so that a coating liquid is prepared; the coating liquid is coated on the intermediate layer; and it is dried and thermally processed.

When the photoconductive material is used with the electric charge conveyance material, the photosensitive layer is structured by the following manner: the photoconductive material which is composed of the photoconductive pigment and a small amount of the electric charge conveyance material whose weight % is not more than 1/5, and preferably 1/1000 to 1/110 (weight ratio) of the photoconductive pigment, and the antioxidant is dispersed into the binder resin. When such the high γ photoreceptor is used, a sharp latent image can be formed although the diameter of the laser beam is spread, and thereby recording can be effectively conducted with high resolution.

In the present example, since color toner images are superimposed on the photoreceptor 401, the photoreceptor, which has spectral sensitivity on the infrared side, and a laser diode, which emits an infrared ray, are used so that a laser beam emitted from the optical scanning system 430 is not shaded by the color toner images.

Next, light decay characteristics of the high γ photoreceptor used in the present example, will be explained as follows.

Figure 14:
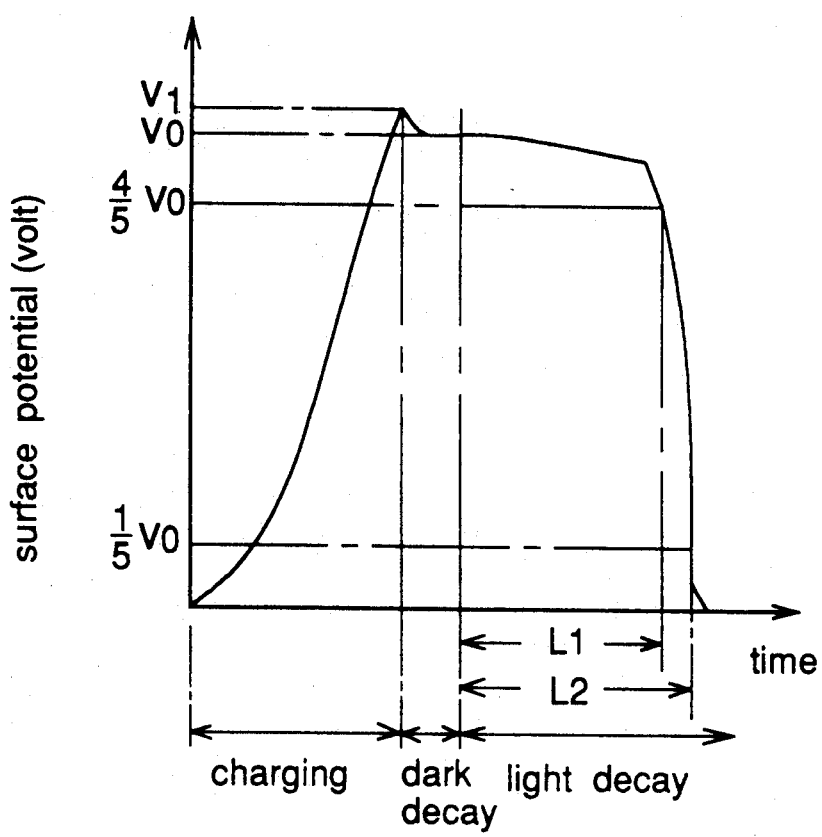
FIG. 14 is a graph showing the characteristics of a high γ photoreceptor utilized in the example.

FIG. 14 is a graph showing characteristics of the high γ photoreceptor. In the drawing, $V_1$ is a charging potential (V), $V_0$ is an initial potential (V) before exposure, $L_1$ is an amount of irradiation (μJ/cm$^2$) of a laser beam which is necessary when the initial potential $V_0$ is decayed to 4/5, and $L_2$ is an amount of irradiation (μJ/cm$^2$) of a laser beam which is necessary when the initial potential $V_0$ is decayed to 1/5.

A preferable range of $L_2/L_1$ is $$1.0 < L_2/L_1 \leq 1.5$$

In the example, $V_1 = 1000$ (V), $V_0 = 950$ (V), $L_2/L_1 = 1.2$, and the photoreceptor potential of the exposure section is 10 V.

When light sensitivity in the position corresponding to a middle period of exposure at which the initial potential ($V_0$) is decayed to $\frac{1}{2}$ in the light decay curve is defined as $E\frac{1}{2}$, and that in the position corresponding to an initial period of the exposure at which the initial potential ($V_0$) is decayed to 9/10 is defined as E9/10, a photoconductive semiconductor which gives the following relations is selected.

$$(E\tfrac{1}{2})/(E9/10) \geq 2$$

and preferably, $$(E\tfrac{1}{2})/(E9/10) \geq 5$$

In the aforementioned, the light sensitivity is defined as the absolute value of an amount of the potential lowering to a minute amount of exposure.

Figure 12:
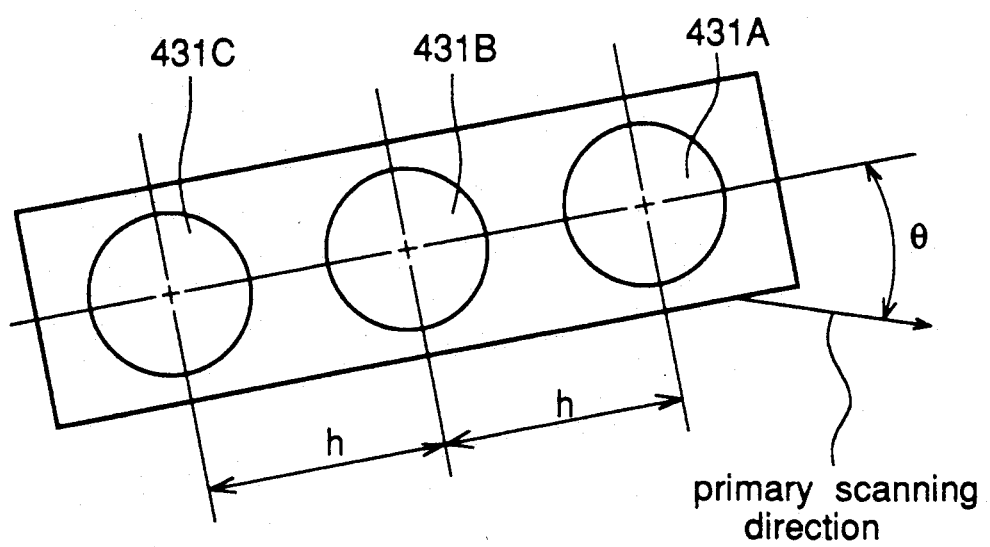
FIG. 12 is an enlarged view showing the semiconductor laser array of the example shown in FIG. 4.
Figure 13:
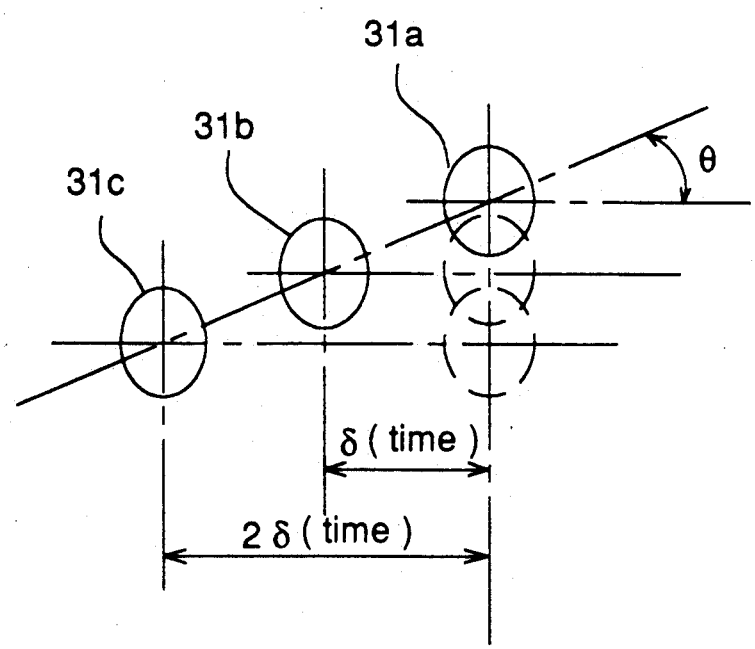
FIG. 13 is a view showing the locus of a laser spot generated by the semiconductor laser array shown in FIG. 12.

In the light decay curve of the photoreceptor 401, the absolute value of the differential factor of the potential characteristics, which means the light sensitivity, is small, as shown in FIG. 14, at the time of a small amount of light, and it sharply increases when an amount of light increases. Specifically, the light decay curve shows the following characteristics: it shows almost horizontal light decay characteristics because sensitivity characteristics are not good during several times of period at the initial period $L_1$ of exposure, as shown in FIG. 12; and however, it shows super high γ characteristics which are lowering almost linearly because it has suddenly super high sensitivity ranging from the middle period of exposure to the latter period thereof. It is considered that the photoreceptor 401 has high γ characteristics by making use of avalanche phenomena under the high charging voltage of, specifically, +500 to +2000 V. That is, it is considered that carriers generated on the surface of photoconductive pigment at the initial period of exposure are effectively trapped by an interface layer of the pigment and coating resin so that the light decay is positively prevented, and thereby extremely sudden avalanche phenomena are generated after the middle period of exposure.

In the present invention, the photoreceptor is preferably provided with high γ characteristics. However, a photoreceptor in which an amount of light and voltage drop are in a proportional relation may be used.

Next, a color image forming method according to the present invention will be explained as follows. In the color image forming method, an objective pixel of the image density data is formed by small pixels of m×n (width×length), and a distribution of the density data of adjoining pixels including the objective pixel, is replaced with the distribution of small pixels of m×n in one pixel, and then, image formation is conducted according to image density data of small pixels obtained when the objective pixel data multiplied by a constant P is distributed according to the aforementioned distribution. This image density data processing is referred to as a resolving power enhancing processing (RE processing), hereinafter. Image formation is conducted by a pulse-width-modulated image signal obtained when image density data which has been RE-processed and a predetermined reference wave are combined. A high γ photoreceptor is effective since it responds to a reference wave correctly to form a latent image.

Figures 6A, 6B:
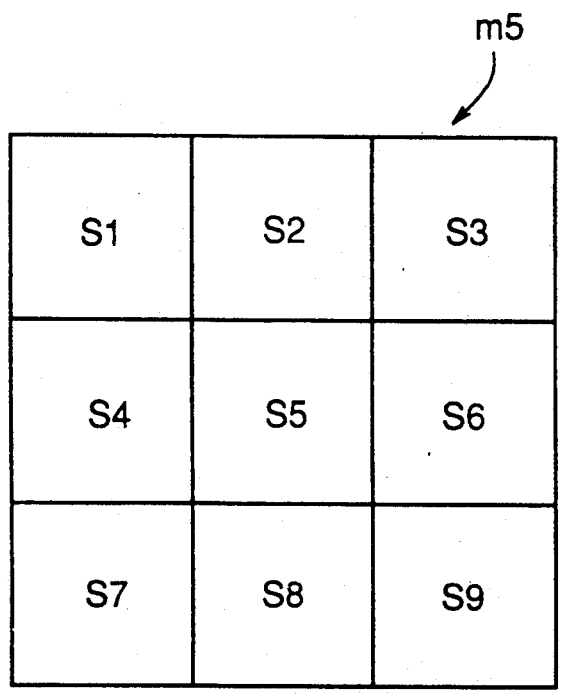
FIGS. 6a-6b are views to explain the RE processing.

RE processing will be explained in detail as follows. FIG. 6(a) is a plan view showing adjoining pixels m1 to m9 including an objective pixel m5 in the case where objective pixel m5 is divided into 3×3. FIG. 6(b) is an enlarged views in which small parts are expressed by s1 to s9 in the case where objective pixel m5 is divided into small pixels of 3×3. Characters m1 to m9 and s1 to s9 represent the density of each part, and density of small pixel $s_i$ is determined by the following equations.

$$s_i = (9 \times m5 \times P \times mi/A) + (1-P) \times m5$$

Where $i = 1, 2, \ldots, 9$, and P is a constant, which is called strength for RE processing, and in which a numeral in the range of 0.1 to 0.9 is used. A is the sum total of m1 to m9.

In the above equation, a term of $(9 \times m5 \times P \times mi/A)$ expresses density in which the density of the objective pixel m5 multiplied by P is distributed to each pixel according to the density ratio of the adjoining pixels, and a term of $(1-P) \times m5$ expresses density in which the residual density of the objective pixel m5 is distributed equally to each small pixel, so that a factor of unsharpness is taken into the equation.

Figures 7A, 7B:
FIGS. 7a-7b are views showing an example of density distribution in the case where RE processing is performed under the condition that m, n=3 and P=0.5.

FIG. 7 is an illustration showing an example in which the objective pixel m5 is divided into 3×3 small pixels, and P=0.5. FIG. 7(a) is an illustration showing an example of the density distribution of the adjoining pixels including the objective pixel m5. FIG. 7(b) is an illustration showing the density distribution in the objective pixel m5 which is calculated by P=0.5.

FIG. 8 and FIG. 9 show an example in which the objective pixel m5 is divided into 2×2 small pixels.

Figure 8A:
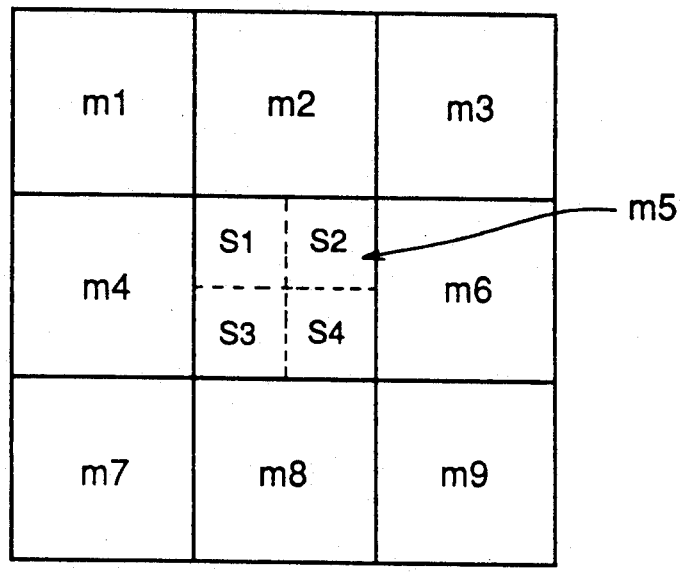
FIGS. 8a-8b are views showing an example of density distribution in the case where RE processing is performed under the condition that m, n=2 and P=0.5.
Figure 8B:
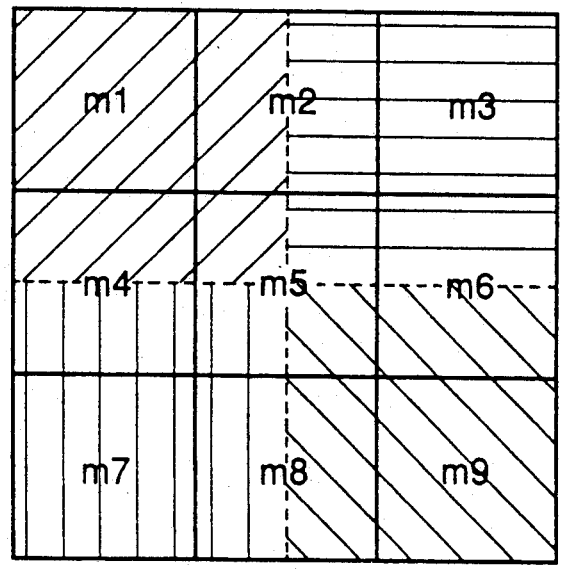

FIG. 8(a) is an illustration showing an example in which the objective pixel m5 is divided into 2×2 small pixels. FIG. 8(b) is an illustration showing an example of the adjoining pixels relating to small pixels s1 to s4 in the objective pixel. Density of s1, s2, s3, and s4 is calculated according to Equation 1.

[Equation 1]
$$s1 = \frac{m1 + m2 + m4 + m5}{A} \times \frac{9}{4} \times m5 \times P + (1 - P) \times m5$$

$$s2 = \frac{m2 + m3 + m5 + m6}{A} \times \frac{9}{4} \times m5 \times P + (1 - P) \times m5$$

$$s3 = \frac{m4 + m5 + m7 + m8}{A} \times \frac{9}{4} \times m5 \times P + (1 - P) \times m5$$

$$s4 = \frac{m5 + m6 + m8 + m9}{A} \times \frac{9}{4} \times m5 \times P + (1 - P) \times m5$$

where $A$ is the total sum of $m1$ to $m9$.

Figure 9A:
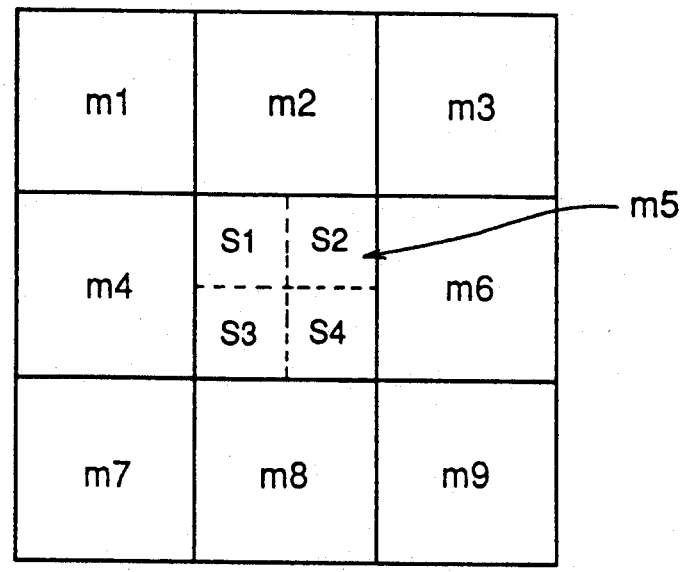
FIGS. 9a-9b are views showing another example of density distribution in the case where RE processing is performed under the condition that m, n=2 and P=0.5.
Figure 9B:
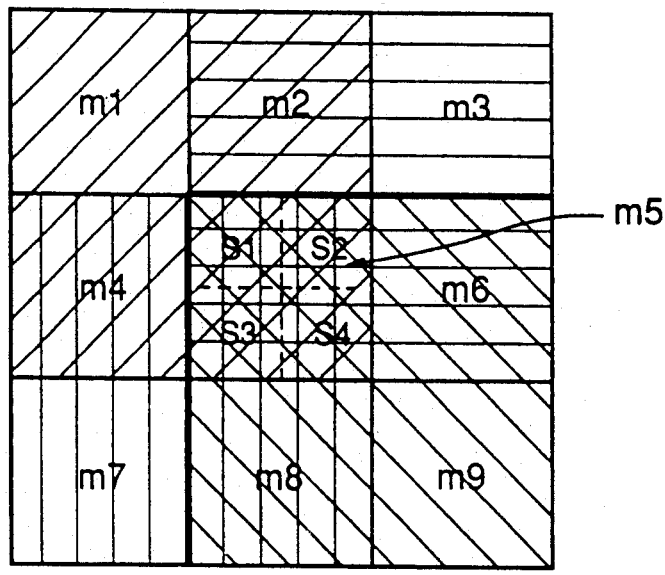

FIG. 9(a) is an illustration showing another example in which the objective pixel m5 is divided into 2×2 small pixels. FIG. 9(b) is an illustration showing another example of the adjoining pixels relating to small pixels s1 to s4 in the objective pixel. Density calculation of s1, s2, s3, and s4 is conducted according to Equation 2.

$$s1 = \frac{4 \times m1 + 2(m2 + m4) + m5}{A} \times$$
[Equation 2]
$$m5 \times P + (1 - P) \times m5$$

$$s2 = \frac{4 \times m3 + 2(m2 + m6) + m5}{A} \times$$
$$m5 \times P + (1 - P) \times m5$$

$$s3 = \frac{4 \times m7 + 2(m4 + m8) + m5}{A} \times$$
$$m5 \times P + (1 - P) \times m5$$

$$s4 = \frac{4 \times m9 + 2(m6 + m8) + m5}{A} \times$$
$$m5 \times P + (1 - P) \times m5$$

where $A$ is the total sum of $m1$ to $m9$.

Figure 1:
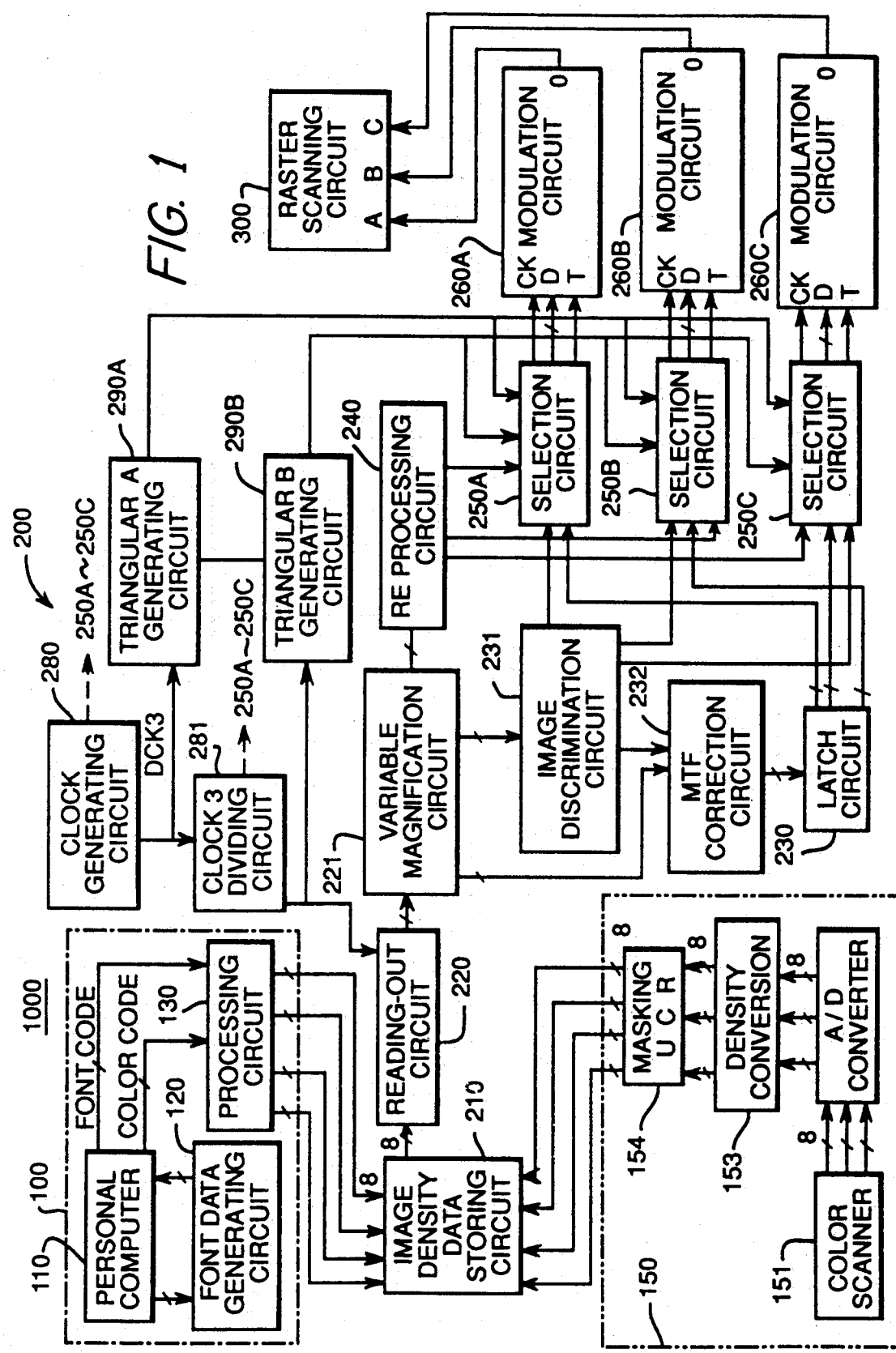
FIG. 1 is a block diagram showing an image processing circuit of the embodiment to which the present invention is applied.
Figure 2:
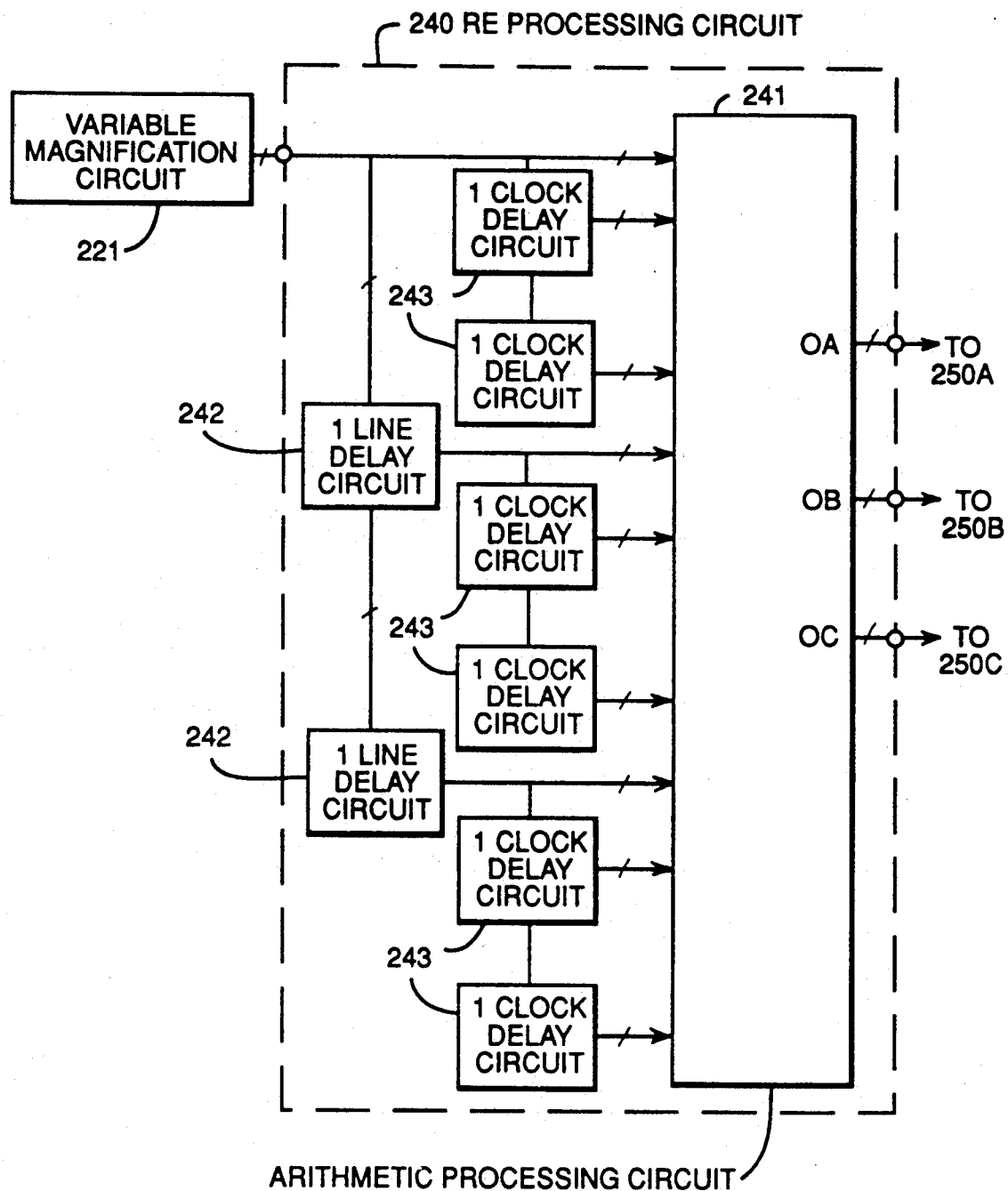
FIG. 2 is a block diagram showing an example of the RE processing circuit in the circuit shown in FIG. 1.

FIG. 1 is a block diagram showing an example of an image processing circuit which is used in a color image forming apparatus of the present invention (an example in which the objective pixel is divided into 3×3). FIG. 2 is a block diagram showing the RE processing circuit 240 of this embodiment. FIG. 3 is a block diagram showing the modulation circuits 260A to 260C of this embodiment. When the objective pixel is divided into 2×2, two laser beams are utilized.

An image processing circuit 1000 of the present embodiment, is a circuit which structures a driving circuit of an optical scanning system, and composed of an image data processing circuit 100, a modulation signal generator 200 and a raster scanning circuit 300.

Figure 10:
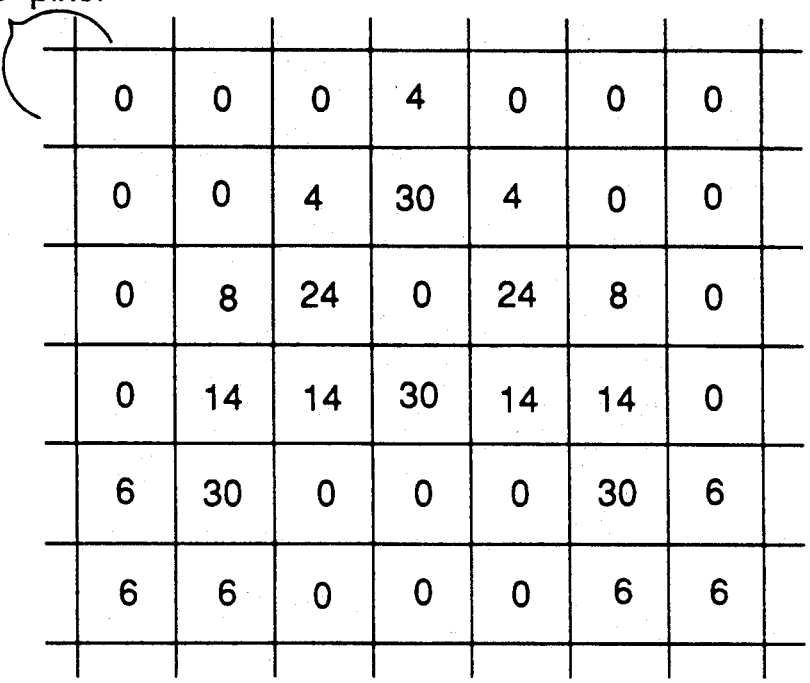
FIG. 10 is a view showing the structure of a character formed by the multi-valued data of present invention.

An image data processing circuit 100 outputs font data which has been multi-valued. The image data processing circuit 100 includes a personal computer 110 and font data generating circuits 120 and 130. The personal computer 110 sends a character code signal, size code signal, positional code signal and color code signal to the font data generating circuit 120. The font data generating circuit 120 selects an address signal from 4 kinds of input signals, and sends the font data to the font data generating circuit 130 through the personal computer 110. The font data generating circuit 130 sends the font data to an image density data storing circuit 210 which is a memory means composed of a frame memory. Generated colors are respectively converted into the density data of yellow (Y), magenta (M), cyan (C) and black (BK) in accordance with the color codes. In the manner described above, under the condition that the configurations are the same and the density ratios are different, the outline font is multivalue-bit-map-developed in each frame memory, for example, as shown in FIG. 10.

Numerals in the drawing shows the density data of a specific color when character "A" is 8-bit-developed. Conventionally, binary-development has been performed. When data is developed as multi-value data, the data can be processed in the image processing system in the same manner as the information sent from the scanner. Further, even when variable magnification processing, RE processing and MTF correction are conducted on the data, the data can be used as font data in which image deterioration is prevented.

The modulation signal generating circuit 200 includes an image density data storing circuit 210 which is a memory means, reading-out circuit 220, latch circuit 230, image discrimination circuit 231, MTF correction circuit 232, RE processing circuit 240, clock generating circuit 280, clock 3 dividing circuit 281, triangular wave A generating circuit 209A, triangular wave B generating circuit 290B, and modulation circuits 260A to 260C.

The clock generating circuit 280 is a circuit which generates a clock pulse. It generates a clock pulse, the frequency of which is three times as much as the clock of the original pixel before the aforementioned RE processing. The clock outputted from the clock generating circuit 280 is a clock for a small pixel, which is referred to as a three time clock $DCK_3$, and outputted to the clock 3 dividing circuit 281, triangular A generating circuit 290A, and selection circuits 250A to 250C. The clock 3 dividing circuit 281 is a circuit which divides the frequency of inputted clock into ⅓. The clock 3 dividing circuit 281 outputs a clock pulse, the period of which is the same as that of the clock of the original pixel, and the frequency of which is ⅓ of 3 times clock $DCK_3$. This clock is referred to as reference clock $DCK_0$, and outputted to the reading-out circuit 220, triangular wave B generating circuit 290B, and selection circuits 250A and 250B.

The triangular wave A generating circuit 290A is a circuit generating triangular wave A, the period of which is the same as that of 3 times clock $DCK_3$. The triangular wave B generating circuit 290B is a circuit generating triangular wave B, the period of which is the same as that of reference clock $DCK_0$. In FIG. 3(b), triangular waves A and B are shown for comparison.

The image density data storing circuit 210 is a usual page memory, which will be referred to as the page memory 210, hereinafter. The image density data storing circuit 210 is a RAM (a random access memory), and has a capacity in which multi-value image density data corresponding to at least one page (one image screen) can be stored. In the case of an apparatus which is applied to a color printer, it is provided with a page memory, the capacity of which is sufficient to store image density signals of a plurality of colors such as yellow, magenta, cyan and black.

The reading-out circuit 220 reads out 3 continuous scanning lines of image density data which is continuous synchronously with reference clock $DCK_0$, from the image density data storing circuit (page memory) 210, and inputs it into the variable magnification circuit 221. In the variable magnification circuit 221, the signal is magnified or reduced in accordance with a predetermined magnification ratio, and then sent out to the RE processing circuit 221, image discrimination circuit 231, and MTF correction circuit 232.

The latch circuit 230 latches image density data based on reference clock $DCK_0$ which had been MTF-corrected, for a period of time corresponding to the processing speed of the RE processing circuit 240, and then sends out the data to the selection circuits 250A to 250C.

As shown in FIG. 2, the RE processing circuit 240 is composed of a one line delay circuit 242, a one clock delay circuit 243, and an arithmetic processing circuit 241. The one line delay circuit 242 operates as follows: the image density data of the first one scanning line of three scanning lines of the image density data in which one scanning line is sent at a time from the variable magnification circuit 221, is delayed by two line scanning time periods by the one line delay circuit 242; the image density data of the second one scanning line is delayed by one line scanning time period by the circuit 242; and the image density data of the last one scanning 242 is not delayed. Further, each image density data is delayed for the time of two reference clocks or one reference clock by the one clock delay circuit 243, and all image density data of the pixels, which include the objective pixel and adjoin the pixel, are sent at the same time to the arithmetic processing circuit 241.

In the arithmetic processing circuit 241, the image density data of the small pixel is obtained by the RE processing. The image density data of the obtained small pixel is divided into a small scanning line including s1, s2, s3 ... shown in FIG. 6, the small scanning line including s4, s5, s6 ..., and the small scanning line including s7, s8, s9 ..., and each of them is sent out to the selection circuits 250A and 250B. One scanning line of the original pixel corresponds to these three scanning lines of the small pixels.

Figure 3A:
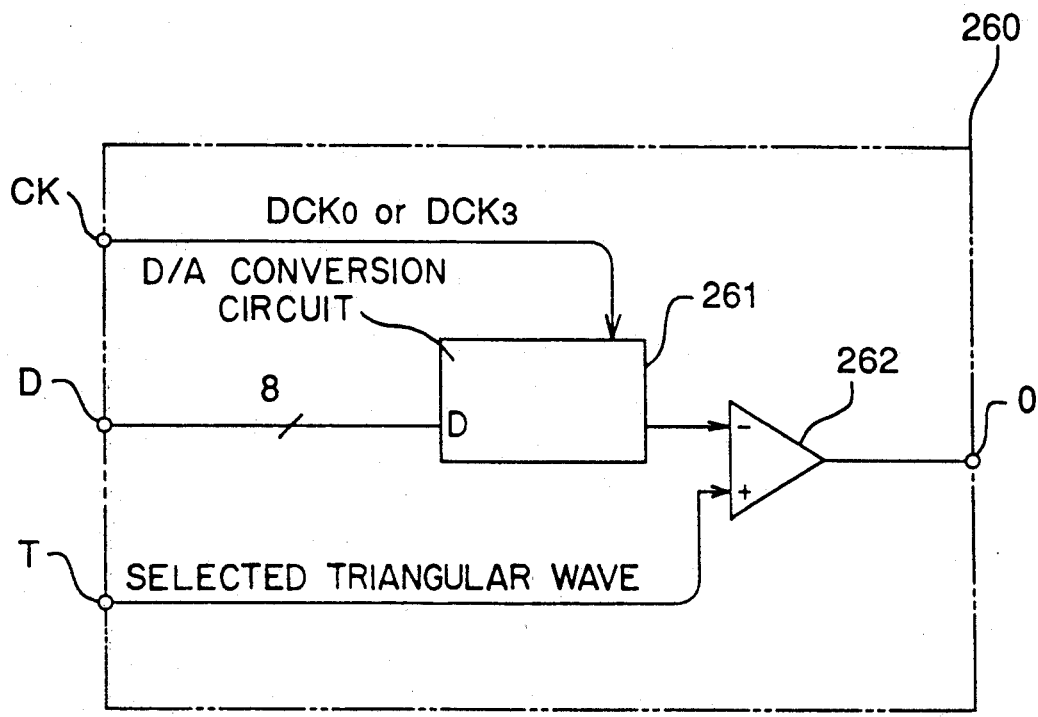
FIG. 3(a) is a block diagram showing an example of the modulation circuit in the circuit shown in FIG. 1.
Figure 3B:
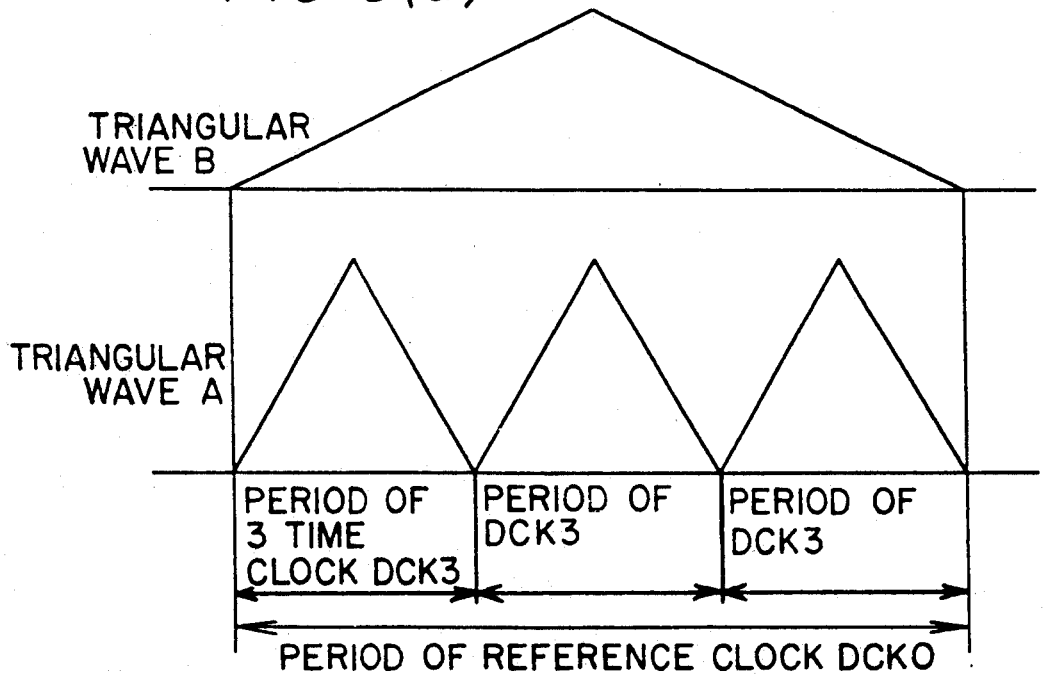
FIG. 3(b) is a view in which a reference wave is shown for comparison.

As shown in FIG. 3(a), the modulation circuits 260A to 260C are the same circuit which is represented by the circuit 260, which includes a D/A conversion circuit 261, comparator 262, input terminal CK of reference clock $DCK_0$ or three times clock $DCK_3$, input terminal D of image density data, and input terminal T of the reference wave. In the modulation circuits 260A to 260C, image density data inputted from the selection circuit 250A to 250C is D/A-converted by the D/A-conversion circuit 261, and the data is compared with triangular wave A or triangular wave B so that a pulse-width-modulation signal is obtained.

The image discriminating circuit 231 discriminates an image so as to discriminate the image whether it is a character, middle tone or halftone dot.

(a) In the case where the image has been discriminated to be a character or halftone, the MTF correction circuit is not activated, and the image data divided into small scanning lines, triangular wave A and 3 times clock $DCK_3$ are sent out to the modulation circuits 260A-260C from the selection circuits 250A-250C through the RE processing circuit 231.

(b) In the case where the image has been discriminated to be a middle tone image, the MTF correction circuit 232 is activated. Then, the image density data subjected to MTF-correction, triangular wave B and reference clock $DCK_0$ are sent out to the modulation circuits 260A-260C from the selection circuits 250A-250C.

In the modulation circuits 260A-260C, in the case of the aforementioned case (a), a modulation signal is generated which has been pulse-width-modulated by triangular wave A, and image data based on 3 times clock $DCK_0$ which has been RE-processed, is sent to the raster scanning circuit 300 while 3 continuous small scanning lines are made into one unit. In the case of the aforementioned case (b), a modulation signal is generated which has been pulse-width-modulated by triangular wave B, and image density data based on reference clock $DCK_0$ which has been MTF-corrected, is sent to the raster scanning circuit 300 while 3 continuous small scanning lines are made into one unit.

FIGS. 5(a) to 5(d) are time charts showing a signal of each part when a modulation signal is generated in the aforementioned case (a).

In the drawing, case (a) shows a portion of image density data which is read out from the page memory 210 according to reference clock $DCK_0$, wherein an index signal is used as a trigger. The image density data is converted into an analog value by the D/A-conversion circuit 261. The higher the level is, the lower the image density is, and the lower the level is, the higher the density is.

Case (b) shows a portion of image density data for small pixels which has been converted into an analog value by the D/A-conversion circuit 261 in the modulation circuit 260 after the data has been RE-processed in the RE processing circuit 240 and outputted according to 3 times clock $DCK_3$.

Case (c) shows triangular wave A (a solid line) based on 3 times clock $DCK_3$ which is a reference wave subsequently outputted to the modulation circuit 260 from the selection circuit 250, and further case (c) shows analog-converted image density data (a one-dotted chain line) so that it shows a modulating operation in the modulation circuit 260.

Case (d) shows a pulse-width-modulated signal generated after the data has been compared by the comparator 262.

Figure 11:
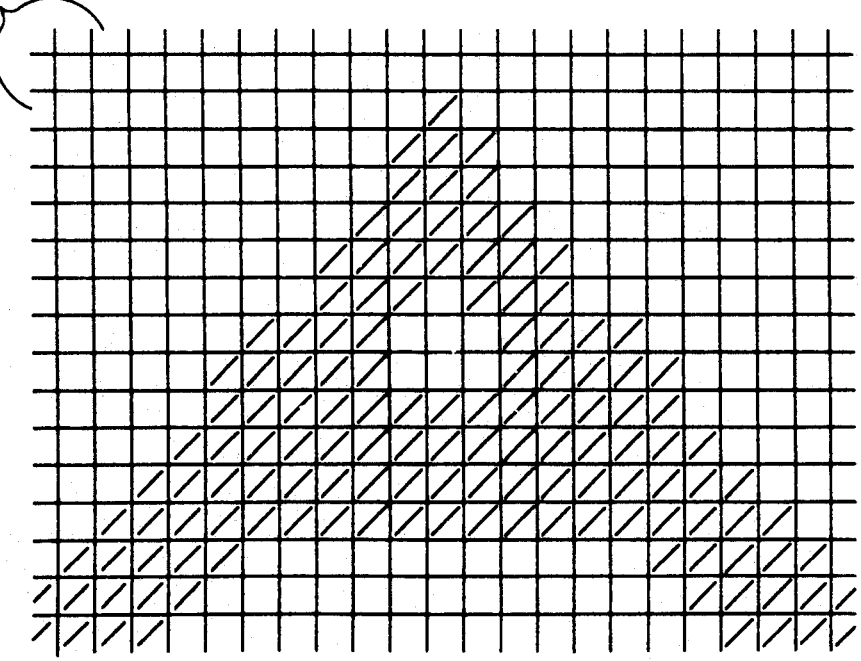
FIG. 11 is a view showing the structure of a character formed by the modulation signal RE-processed of present invention.

FIG. 11 is a view showing the structure of a character formed by the modulation signal which has been RE-processed in the aforementioned case (a). Density data exists in a hatched small pixel portion. As shown in the drawing, in the hatched portion of a character and an image, the image can be clearly reproduced as compared with conventional binarized data.

The raster scanning circuit 300 includes a laser driver, index detection circuit, and polygonal mirror driver which are not shown in the drawing.

The laser driver makes a semiconductor laser array 431 having a plurality of laser emitting parts (in this embodiment, 3 laser emitting parts) oscillate according to the modulation signal sent from the modulation circuits 260A-260C. A signal which corresponds to the amount of beam emitted from the semiconductor laser array 431, is fed back so that the amount of beam can be maintained constant.

The index detection circuit detects the surface position of the polygonal mirror which is rotated at a predetermined speed according to the index signal sent from the index sensor 439, so that optical scanning is conducted in the period of primary scanning by the raster scanning system in accordance with the modulated digital image density signal. The scanning frequency is 2204.72 Hz, and the effective printing width is not less than 297 mm, and the effective exposure width is not less than 306 mm.

In the polygonal mirror driver, a DC motor is rotated at a predetermined speed so that the polygonal mirror 436 is rotated at a rotating speed of 16535.4 rpm.

As shown in FIG. 12, in the semiconductor laser array 431, 3 light emitting parts are arrayed at regular intervals. Usually, it is difficult to set the light emitting parts so that the intervals can be maintained to be not more than 20 $\mu$m. Therefore, the light emitting parts are disposed in the following manner: an axis passing through the center of each light emitting part is set in parallel with the rotating shaft of the polygonal mirror 436, and at the same time, the axis is inclined by a predetermined angle $\theta$ with regard to the primary scanning direction. In the manner described above, laser spots of the laser beams emitted from the semiconductor laser array 431 scan on the surface of the photoreceptor 401 in such a manner that the laser spots are closely contacted in the vertical direction. However, for the reason mentioned above, the position of each laser spot is slipped in the scanning direction. Correction of this slippage is performed in the following manner: a delay circuit is inserted into between the modulation circuits 260B, 260C and the laser driver, so that an appropriate amount of delay is applied to correct the slippage. In this manner, laser spots emitted from the semiconductor laser array 431 are vertically aligned to be recorded.

Next, the image forming process of the image forming apparatus 400 will be explained as follows.

First, the photoreceptor 401 is uniformly charged by the scorotron charger 402. An electrostatic latent image corresponding to yellow is formed on the surface of the drum-shaped photoreceptor 401 when laser beams are irradiated which have been optically modulated according to yellow data (8-bit digital density data) stored in the image density data storing circuit 210. The aforementioned electrostatic latent image corresponding to yellow is developed by the first developing unit 441, and a very sharp dot-shaped first toner image (a yellow toner image) is formed on the photoreceptor 401. This first toner image is not transferred onto a recording paper, and passes under a cleaning unit which has been withdrawn from the surface of the photoreceptor drum 401, and the photoreceptor drum 401 is electrically charged again by the scorotron charger 402. Next, the laser beams are optically modulated by the magenta data (8-bit digital density data). The modulated laser beams are irradiated on the photoreceptor 401 so that an electrostatic latent image is formed. This electrostatic latent image is developed by the second developing unit 442, and the second toner image (a magenta toner image) is formed. In the same manner described above, the third toner image (a cyan toner image) is developed by the third developing unit 443. In this manner, three color images are sequentially laminated on the photoreceptor 401. Finally, the fourth toner image (a black toner image) is formed and laminated on the photoreceptor 401, so that a 4-color toner image can be formed.

According to the image forming apparatus 400 of the present embodiment, in the case where the photoreceptor has high $\gamma$ characteristics, a latent image is stably formed even when a plurality of charging and exposing processes are repeated on a toner image so that the toner image can be superimposed. That is, even when laser beams are irradiated on the toner image in accordance with a digital signal, a sharp dot-shaped electrostatic latent image without a fringe can be formed, and as a result, a sharp toner image can be obtained.

The aforementioned 4-color toner image is transferred onto a recording paper supplied from a paper supply device by the action of a transfer unit 462.

The recording paper onto which the toner image has been transferred, is separated from the photoreceptor 401 by a separation electrode 463, and conveyed by a guide and a conveyance belt. After that, the recording paper is conveyed into a fixing unit 464 so that the toner image is thermally fixed, and then the recording paper is discharged onto a paper discharge tray.

In this embodiment, an experiment was made under the condition that factor P of RE processing was variously changed. As a result, excellent images were obtained when factor P was in the range of 0.1 to 0.9, and especially when factor P was in the range of 0.4 to 0.5, excellent results were provided.

As explained above, according to the present invention, the data in which the outline font is multi-valued, is accommodated in the memory, so that the data can be processed in the same manner as the density information inputted with the scanner. Image data subjected to RE-processing in which an objective pixel is divided into small pixels and the density of the objective pixel is distributed to the small pixels in accordance with the density distribution of the adjoining pixels including the objective pixel, is modulated by the reference wave so that the modulation signal is generated. When the image forming apparatus in which image recording is performed by the aforementioned modulation signal, is adopted, the sharpness of an image made by a scanner, C.G and font data, can be improved, and the edge portions of characters and line images can be expressed clear, and further small characters can be clearly reproduced. Even when images are enlarged, unevenness of the contour can be eliminated, and even when they are reduced, they can be continuously expressed. Even when images have a middle tone, image formation can be performed excellently. Even when a document composed of half tone dots, moire stripes do not appear.

Figure 16:
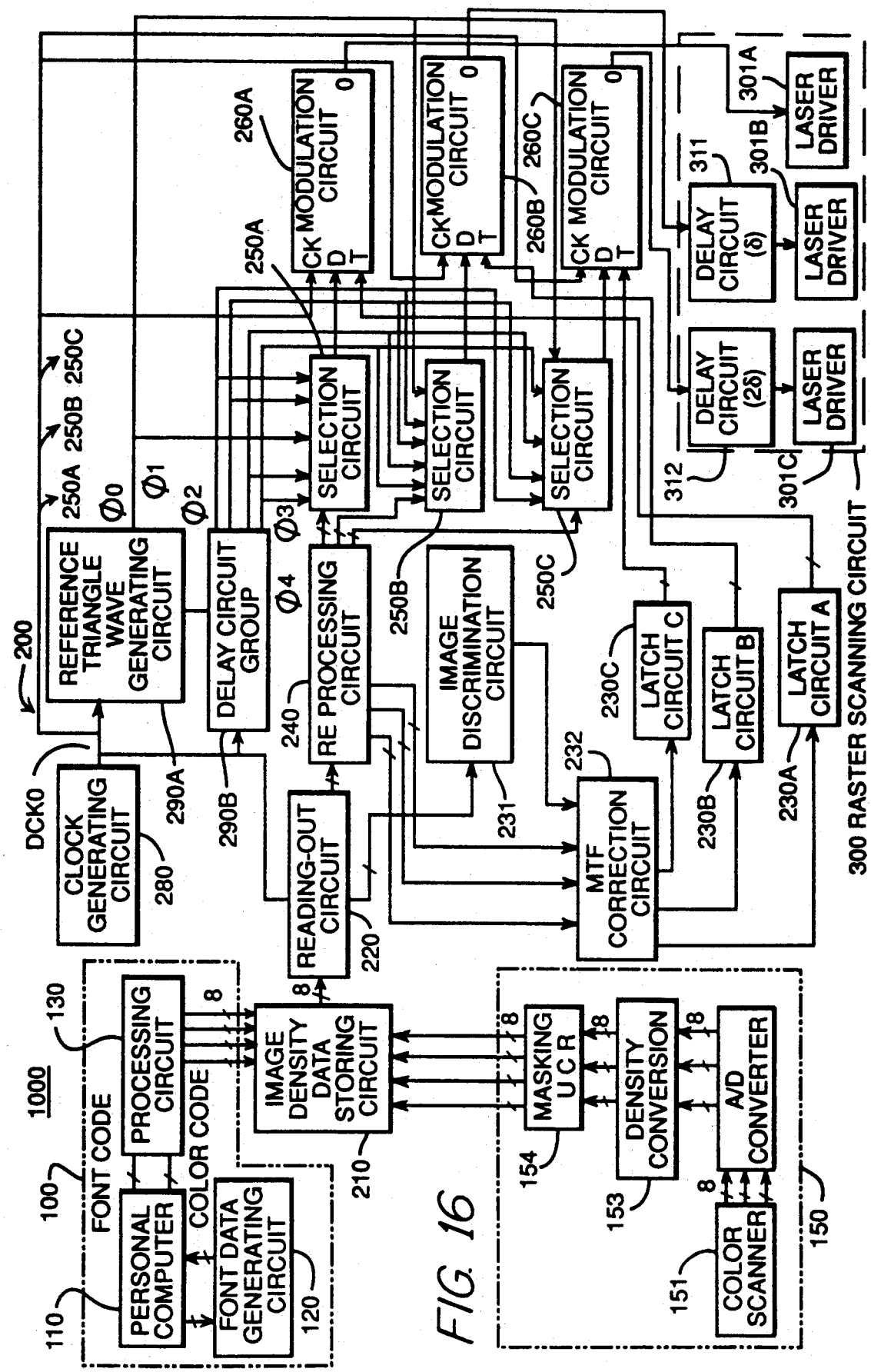
FIG. 16 is a block diagram of the image processing circuit of an example of the image forming apparatus of the present invention.

Next, an embodiment will be explained in which recording-position-modulation is conducted in the primary scanning direction so as to form a dot-latent-image. The image processing circuit of an image forming apparatus which can achieve the aforementioned embodiment, is shown in FIG. 16.

In this embodiment, the modulation signal generating circuit 200 includes the image density data storing circuit 210 which is a memory means, reading-out circuit 220, latch circuit 230A to 230C, image discrimination circuit 231, MTF-correction circuit 232, RE-processing circuit 240, clock generating circuit 280, reference triangular wave generating circuit 290A, delay circuit group 290B, selection circuits 250A to 250C, and modulation circuits 260A to 260C.

The clock generating circuit 280 generates reference clock pulse $DCK_0$. Reference clock pulse $DCK_0$ outputted form the clock generating circuit 280 is outputted into the reading-out circuit 220, reference triangular wave generating circuit 290A, delay circuit group 290B, selection circuits 250A to 250C, and modulation circuits 260A to 260C.

The reference triangular wave generating circuit 290A generates a reference triangular wave $\phi_0$, the period of which is the same as that of reference clock $DCK_0$ and there is no phase slippage between reference triangular wave $\phi_0$ and reference clock $DCK_0$. The delay circuit group 290B generates a triangular wave $\phi_1$ which is delayed by $\frac{1}{3}$ period with regard to reference triangular wave $\phi_0$, and a triangular wave $\phi_2$ which is delayed by $\frac{2}{3}$ period (that is, advanced by $\frac{1}{3}$ period). FIG. 17(b) is a view in which triangular waves $\phi_0$ to $\phi_2$ on a small scanning line are compared.

In the same manner as the aforementioned embodiment, a multi-value bit-map is developed in the image density data storing circuit 210 which is a memory means.

The reading-out circuit 220 reads out image density data, the amount of which corresponds to 3 continuous scanning lines which continue synchronously with reference clock $DCK_0$, from the image density data storing circuit (page memory) 210, wherein the index signal is used as a trigger. Then, the image density data is sent to the RE-processing circuit 240 and the image discrimination circuit 231.

The latch circuit 230 latches the data for a period of time which is required for the RE-processing circuit 240 to process the data, and then the data is sent to the modulation circuits 260A to 260C.

In the arithmetic processing circuit 241, the aforementioned RE-processing is carried out so that density data of small pixels is obtained. For example, in the case of n=3, the obtained density data of small pixels is divided into a small scanning line including s1, s2, s3 shown in FIG. 6, a small scanning line including s4, s5, s6, and a small scanning line including s7, s8, s9. The divided density data is respectively sent to the modulation circuits 260A and 260B, and at the same time, the gravity center of density data in the objective pixel is calculated. Then, a selection signal to select a reference wave, the phase of which corresponds to the gravity center, is sent to the selection circuits 250A to 250C. That is, the selection signal is selected and sent to the selection circuit 250A in the following manner: in the case of the small scanning line of s1, s2 and s3, when the gravity center of density data exists in s1, triangular wave $\phi_2$ which is advanced by $\frac{1}{3}$ period, is selected; when the gravity center of density data exists in s2, reference triangular wave $\phi_0$ is selected; and when the gravity center of density data exists in s3, triangular wave $\phi_1$ which is delayed by $\frac{1}{3}$ period, is selected. In the cases of other small scanning lines, the selection signal is sent to the selection circuits 250B and 250C in the same manner.

Three small scanning lines described above correspond to one scanning line of the original pixel. Writing (recording) of image data of small scanning lines including s1, s2 and s3 is conducted by the light emitting part 431A of the semiconductor laser array 431 which will be described later. Writing of image data of small scanning lines including s4, s5 and s6 is conducted by the light emitting part 431B of the semiconductor laser array 431. Writing of image data of small scanning lines including s7, s8 and s9 is conducted by the light emitting part 431C of the semiconductor laser array 431.

Figure 17A:
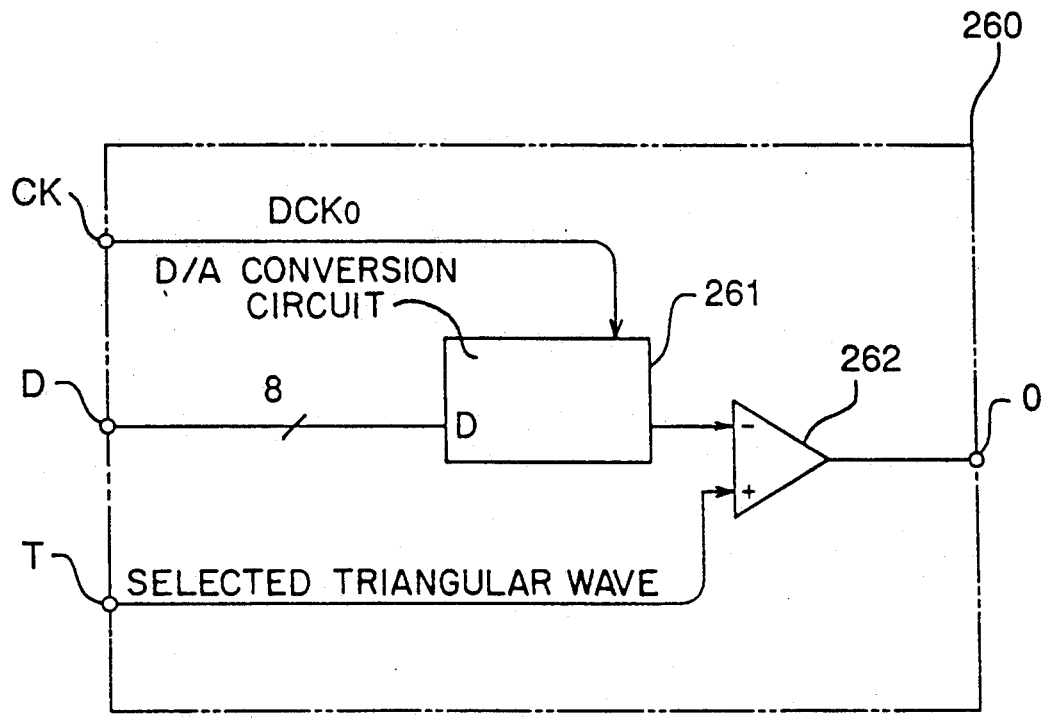
FIG. 17(a) is a block diagram showing an example of the modulation circuit in the circuit shown in FIG. 1.
Figure 17B:
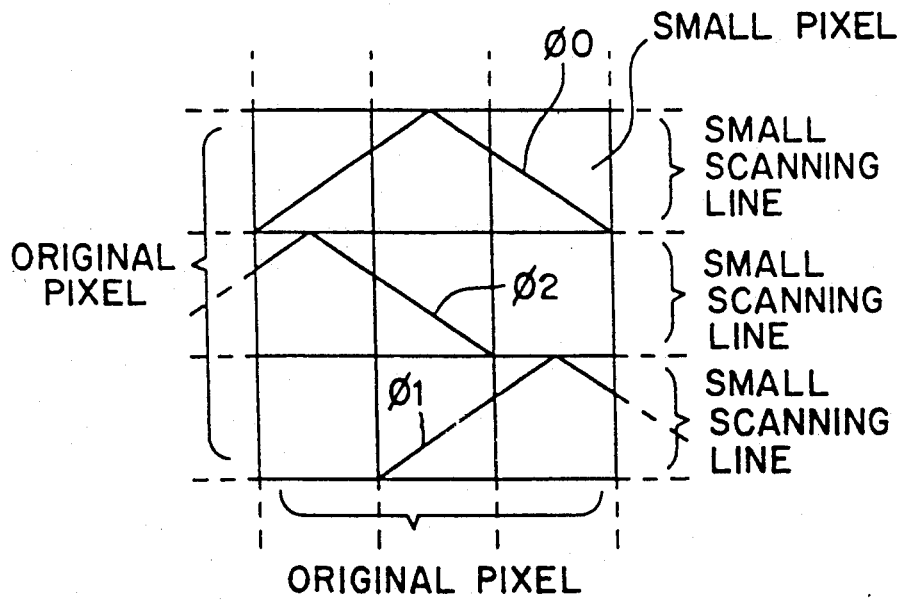
FIG. 17(b) is a view showing a reference wave for comparison.

As shown in FIG. 17(a), the modulation circuits 260A to 260C are the same as the modulation circuit 260. The modulation circuits 260A to 260C are provided with the D/A conversion circuit 261, input terminal CK of the comparator 262 and reference clock $DCK_0$, input terminal D of image density data, and input terminal T of a reference wave. Image data of small scanning line inputted through the latch circuits 230A to 230C is D/A-converted by the D/A-conversion line 261. The image data is compared wherein a triangular wave selected from the aforementioned triangular waves $\phi_0$, $\phi_1$, $\phi_2$ inputted from the selection circuits 250A to 25C, is used as a reference wave, so that a pulse-width-modulation signal is obtained.

The image discrimination circuit 231 discriminates whether the image is either of a character, middle tone or halftone dot.

(a) When it is discriminated that the image is composed of characters and halftone dots, the MTF correction circuit 232 is not activated, and image data divided into small scanning lines outputted from the RE-processing circuit 231, is directly sent to the modulation circuits 260A to 260C. A selection signal to select a triangular wave, the phase of which corresponds to the gravity center of small scanning lines, is sent to the selection circuits 250A to 250C.

(b) When it is discriminated that the image is a middle tone, the MTF correction circuit 232 is activated so as to MTF-correct the image data. Then, the image data is sent to the modulation circuits 260A to 260C.

In the modulation circuits 260A to 260C, operations are performed in the following manner: in the aforementioned case (a), a modulation signal is generated which has been pulse-width-modulated by a triangular wave in which image data on small scanning lines is selected, wherein the image data has not been MTF-corrected and has been RE-processed; in the aforementioned case (b), a modulation signal is generated which has been pulse-width-modulated by a triangular wave in which MTF-corrected image data on small scanning lines has been selected; and image data, the amount of which corresponds to 3 continuous small scanning lines, that is, the amount of which corresponds to one line of original image density data, is sent out to the raster scanning circuit 300 as one unit.

FIGS. 18(a) to 18(d) are time charts showing each signal when a modulation signal is generated at each small scanning line in the aforementioned case (a).

Figure 18A:
FIGS. 18a-18d time charts showing a signal of a small scanning line in the modulation signal generating circuit in the example shown in FIG. 1.

FIG. 18(a) shows a portion of image density data of small scanning lines which is read out from the page memory 210 according to reference clock $DCK_0$, wherein the index signal is used as a trigger. The image density data is converted into an analog value by the D/A-conversion circuit 261, and the higher the level is, the lower the image density is, and when the lower the level is, the higher the image density is.

Figure 18B:
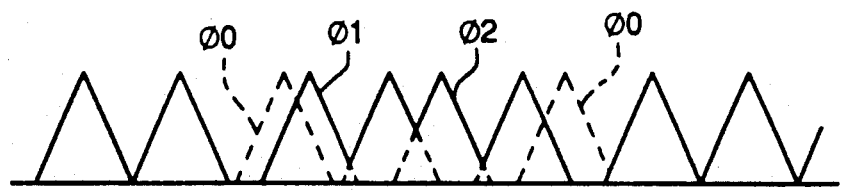

FIG. 18(b) shows a reference wave which is RE-processed by the RE-processing circuit 240, selected according to the position of the gravity center of density data, and inputted into T-terminal of the modulation circuit 260.

Figure 18C:
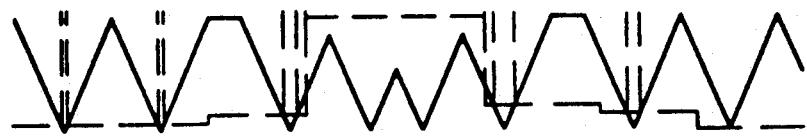

FIG. 18(c) shows a triangular wave (shown by a solid line) which is sequentially outputted into the modulation circuits 260A-260C from the selection circuits 250A-250C, and image density data (shown by a one-dotted chain line) which has been analog-converted. Therefore, FIG. 18(c) shows a modulating operation conducted in the modulation circuits 260A-260C.

Figure 18D:
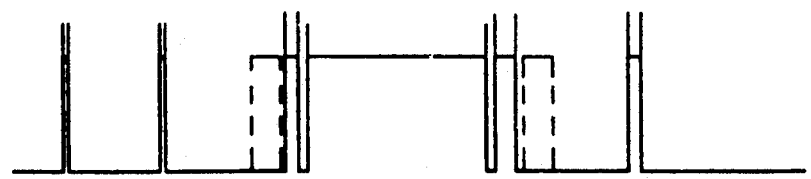

FIG. 18(d) shows a pulse-width-modulation signal which generated being compared by the comparator 262. A signal shown by a dotted line in the drawing, is a modulation signal on which recording-position-modulation has not been conducted in the case of modulation of reference triangular wave $\phi_0$.

As described above, a pulse-width-modulation accompanied by recording-position-modulation, is conducted by a reference wave of different phase. This modulation signal divided at each small scanning line is sent to each light emitting part of the semiconductor laser array 431 having n pieces of light emitting parts through the laser drivers 301A–301C. Due to the foregoing, latent image formation is conducted at each small scanning line, so that recording density in the auxiliary direction is increased to n times.

As explained above, in this embodiment, recording-position-modulation is conducted in both the primary and auxiliary directions according to the distribution of image density. Therefore, characters and line images can be clearly reproduced as compared with a conventional case in which binary data is utilized.

In the aforementioned embodiment, in order to simplify the explanation, 3 triangular waves are utilized in which the phases of reference waves are different by ⅓ period. Of course, it is possible to conduct more accurate recording-position-modulation when 5 or 7 triangular waves are utilized, wherein the phases of reference waves are different by 1/6 period.

As explained above, in the apparatus of the present invention, data in which an outline font is multi-valued, is accommodated in the memory, so that the data can be processed in the same manner as the density information inputted by a scanner. The modulation signal is generated in the following manner: the objective pixel is divided into small pixels; and the density of each small pixel is modulated by a reference wave which is selected from the gravity center of image data of each small scanning line, wherein RE-processing is conducted in which the density of the objective pixel is distributed in accordance with the density data distribution of the adjoining pixels including the objective pixel. Image formation is carried out by the semiconductor laser array which is driven by the aforementioned modulation signal. Then, recording-position-modulation is conducted in the primary scanning direction, and image recording is conducted in the auxiliary direction over n pieces of light emitting parts. As a result, sharpness of images made by scanners, C.G and font data, can be improved, so that the edge portions of character and line images are reproduced clearly as compared with conventional cases. Further, even small characters can be clearly reproduced. Even when images are enlarged or reduced, the edge portions can be reproduced properly. Even when the images are provided with a middle tone, reproduction is not affected. Even when a document image is composed of halftone dots, moire stripes do not appear on the copied image.

What is claimed is:

1. An apparatus for forming an electrostatic latent image in the form of a dot on a photoreceptor, comprising:
    a light beam generator which generates a light beam by which the photoreceptor is exposed in the form of a dot;
    a memory which stores outline font data, said outline font data comprising plural pixel data, each of which is represented by a multi-value data to indicate an intermediate density level; and
    a modulating circuit to control the light beam generator so as to modulate the light beam related to the outline font data so that a dot-shaped latent image is formed on the photoreceptor, wherein the modulating circuit changes the dot size of the dot-shaped latent image in accordance with the multi-value data of the outline font data.

2. The apparatus of claim 1, further comprising;
    a first data processor which conducts at least one of an enlarging-reducing process, a resolution enhancement process, an image discrimination process and a M.T.F. correction process to convert pixel data into processed pixel data;
    wherein the modulating circuit controls the light beam generator related to processed pixel data.

3. A method of forming an electrostatic latent image in a form of a dot on a photoreceptor, comprising:
    preparing a memory for storing outline font data, said outline font data comprising plural pixel data, each of which is represented by a multivalue data to indicate an intermediate density level; and
    modulating a light beam related to the outline font data so that a dot-shaped latent image is formed on the photoreceptor, wherein the dot size of the dot-shaped latent image is changed in accordance with the multivalue data of the outline font data.

4. The apparatus of claim 1, further comprising
    a second data processor which converts one of the pixel data into plural small pixel data in accordance with at least two of the pixel data;
    wherein the modulating circuit controls the light beam generator so as to modulate the light beam in relation to the small pixel data.

5. The apparatus of claim 4, wherein the second data processor converts one of pixel data (m5) into 3×3 small pixel data (s1 to s9) as follows:

$$si = (9 \times m5 \times p \times mi/A) + (1-P) \times m5,$$

wherein:
    $i = 1, 2, \ldots, 9$;
    m1 to m4 and m6 to m9 represent pixel data which adjoins the pixel;
    m5 = the pixel data;
    $A = m1 + m2 + \ldots + m9$; and
    P = constant. $(0.1 \leq P \leq 0.9)$.

6. The apparatus of claim 4, wherein the second data processor converts one of pixel data (m5) into 2×2 small pixel data (s1 to s4) as follows:

$$s1 = (m1 + m2 + m4 + m5)/A \times 9/4 \times m5 \times p + (1-P) \times m5$$

$$s2 = (m2 + m3 + m5 + m6)/A \times 9/4 \times m5 \times p + (1-P) \times m5$$

$$s3 = (m4 + m5 + m7 + m8)/A \times 9/4 \times m5 \times p + (1-P) \times m5$$

$$s4 = (m5 + m6 + m8 + m9)/A \times 9/4 \times m5 \times p + (1-P) \times m5;$$

wherein:
    m1 to m4 and m6 to m9 represent pixel data which adjoins the pixel;
    m5 = the pixel data;
    $A = m1 + m2 + \ldots + m9$; and
    P = constant. $(0.1 \leq P \leq 0.9)$.

7. The apparatus of claim 4, wherein the second data processor converts one of pixel data (m5) into 2×2 small pixel data (s1 to s4) as follows:
wherein:

m1 to m4 and m6 to m9 represent pixel data which adjoins the pixel;
m5 = the pixel data;
A = m1 + m2 + ... + m9; and
P = constant. (0.1 ≦ P ≦ 0.9).

8. The apparatus of claim 4, further comprising
a first type of reference wave signal generator;
a third data processor which converts the small pixel data into a image density data signal; and
a comparator which compares the density data signal and the first type of reference wave signal;
wherein the modulating circuit controls the light generator so as to modulate the light beam on the basis of the result of the comparison in the comparator.

9. The apparatus of claim 8, further comprising
a second type of reference wave signal generator;
a selector which selects one of the first or second type of reference wave signals;
wherein the comparator compares the density data signal and the selected one of said first or second type reference wave signals.

10. The method of claim 3, further comprising the step of;
generating plural small pixel data from one of the pixel data in accordance with at least two of the pixel data;
wherein in the step of modulating, the light beam is modulated related to the small pixel data.

11. The method of claim 10, wherein in the step of generating plural small pixel data, the pixel is divided into 3×3 small pixels and each small pixel data (s1 to s9) is determined by the following equations:

$$si = (9 \times m5 \times p \times mi/A) + (1-P) \times m5,$$

wherein:
i = 1, 2, ..., 9;
m1 to m4 and m6 to m9 represent pixel data which adjoins the pixel;
m5 = the pixel data;
A = m1 + m2 + ... + m9; and
P = constant. (0.1 ≦ P ≦ 0.9).

12. The method of claim 10, wherein in the step of generating plural small pixel data, the pixel is divided into 2×2 small pixels and each small pixel data (s1 to s4) is determined by the following equations:

$$s1 = (m1+m2+m4+m5)/A \times 9/4 \times m5 \times p + (1-P) \times m5$$

$$s2 = (m2+m3+m5+m6)/A \times 9/4 \times m5 \times p + (1-P) \times m5$$

$$s3 = (m4+m5+m7+m8)/A \times 9/4 \times m5 \times p + (1-P) \times m5$$

$$s4 = (m5+m6+m8+m9)/A \times 9/4 \times m5 \times p + (1-P) \times m5;$$

wherein:
m1 to m4 and m6 to m9 represent pixel data which adjoins the pixel;
m5 = the pixel data;
A = m1 + m2 + ... + m9; and
P = constant. (0.1 ≦ P ≦ 0.9).

13. The method of claim 10, wherein in the step of generating plural small pixel data, the pixel is divided into 2×2 small pixels and each small pixel data (s1 to s4) is determined by the following equations:

$$s1 = (4+m1+2(m2+m4)+m5)/A \times m5 \times p + (1-P) \times m5$$

$$s2 = (4+m3+2(m2+m6)+m5)/A \times m5 \times p + (1-P) \times m5$$

$$s3 = (4+m7+2(m4+m8)+m5)/A \times m5 \times p + (1-P) \times m5$$

$$s2 = (4+m9+2(m6+m8)+m5)/A \times m5 \times p + (1-P) \times m5;$$

wherein:
m1 to m4 and m6 to m9 represent pixel data which adjoins the pixel;
m5 = the pixel data;
A = m1 + m2 + ... + m9; and
P = constant. (0.1 ≦ P ≦ 0.9).

14. The method of claim 10, further comprising the step of;
generating a first type of reference wave signal;
converting the small pixel data to a image density data signal;
generating a modulating wave signal by means of comparing the density data signal and the first type of reference wave signal;
wherein in the step of modulating, the light beam is modulated on the basis of the modulating wave signal.

15. The method of claim 14, further comprising the step of;
generating a second type of reference wave signal;
selecting one reference wave signal from the first and second types of reference wave signals;
wherein in the step of generating a modulating wave signal, the modulating wave signal is generated by means of comparing the density data signal and the selected one of the first and second types of reference wave signals.

* * * * *

UNITED STATES PATENT AND TRADEMARK OFFICE
CERTIFICATE OF CORRECTION

PATENT NO. : 5,265,196
DATED : November 23, 1993
INVENTOR(S) : Satoshi Haneda

It is certified that error appears in the above-indentified patent and that said Letters Patent is hereby corrected as shown below:

*Claim 7, column 16, line 67, after "as follows:" insert
--$s1 = (4 + m1 + 2(m2 + m4) + m5)/A \times m5 \times p + (1 - P) \times m5$ $s2 = (4 + m3 + 2(m2 + m6) + m5)/A \times m5 \times p + (1 - P) \times m5$ $s3 = (4 + m7 + 2(m4 + m8) + m5)/A \times m5 \times p + (1 - P) \times m5$ $s2 = (4 + m9 + 2(m6 + m8) + m5)/A \times m5 \times p + (1 - P) \times m5$--.

Claim 14, column 18, line 37, change "a" to --an--.

Signed and Sealed this

Thirtieth Day of August, 1994

Attest:

*Attesting Officer*

BRUCE LEHMAN

*Commissioner of Patents and Trademarks*